UNITED STATES PATENT OFFICE.

JONATHAN H. GREENE, OF PHILADELPHIA, PA., ASSIGNOR, BY DIRECT AND MESNE ASSIGNMENTS, TO HIMSELF, DANIEL W. WAGNER, OF NEW HAVEN, CONN., AND RICHARD T. WILSON, OF PHILADELPHIA, PA.

UTILIZING WASTE OIL-CLOTH, &c.

SPECIFICATION forming part of Letters Patent No. 276,029, dated April 17, 1883.

Application filed February 24, 1883. (No specimens.)

*To all whom it may concern:*

Be it known that I, JONATHAN H. GREENE, a citizen of the United States, residing in the city and county of Philadelphia, State of Pennsylvania, have invented a new and useful Improvement in Utilizing Waste Oil-Cloth, &c., which improvement is fully set forth in the following specification.

My invention has for its object the economic removal from waste oil-cloth and cloths covered with paint, varnish, &c., of the paint or foreign material with which the cloth is covered, whereby the paint, &c., and the cleansed fabric may be once more utilized as a clean fibrous material, the process also removing all odor or smell from the substance treated.

In carrying out my invention I take a mass composed of textile material covered with oil, paint, tar, or varnish, and cover it, in a suitable open vessel, with a solution of caustic alkali of a strength of about 15°. This is brought to a boiling-heat by means of a furnace or steam-pipes passing through it or around the vessel containing it. After the boiling has continued for a time—say not exceeding twenty minutes—it will be found that there is a greasy matter separated from the fabric, the same floating at the top. All the fluid is then drawn off, including the greasy matter. I take another solution of caustic soda of such a strength that when added to the wet mass already in the vessel the whole will be of a strength of solution of about 30°.

The boiling is then continued for forty minutes longer and the liquor again run off, after which a fresh solution is added of such strength as to raise the aggregate strength to 45°. The boiling is further continued one or more hours until the fiber is perfectly clear of its foreign coating. The mass of fibrous material is now plunged into a bath of clear hot water or alum-water, in which it is thoroughly rinsed. The fiber is then dried and pressed, ready for market.

It will be found that the real pigment—the paint or coloring-matter—settles to the bottom of each of the drawn-off solutions. These several settlings are afterward added to each other, and may be substantially utilized for making paint, and for other useful purposes. The alkali preferably used for my solution is causticised soda.

Having thus described my invention, what I claim as new, and desire to secure by Letters Patent, is—

The process of cleaning oil-cloth, tar-cloth, &c., by boiling the same in several successive solutions of caustic alkali, each succeeding solution being of increased strength over the preceding one, and removing the liquor and matter in suspension at one stage of boiling before the succeeding solution is added, substantially as and for the purpose described.

JONATHAN H. GREENE.

Witnesses:
JOHN A. WIEDERSHEIM,
A. P. GRANT.